(No Model.)
G. A. SMITH.
MILLSTONE DRESSING MACHINE.
No. 463,460. Patented Nov. 17, 1891.
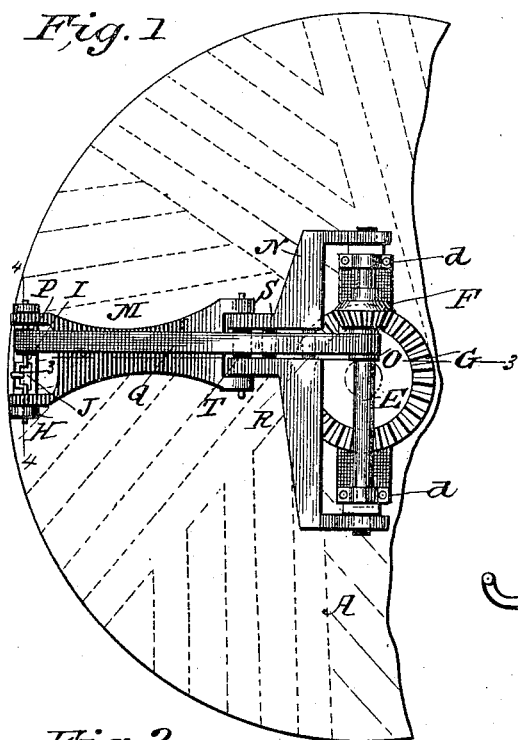
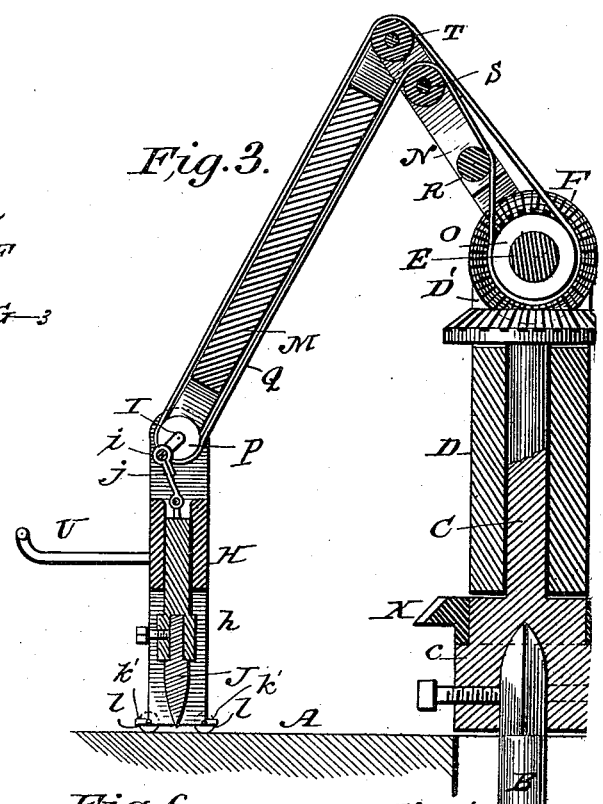
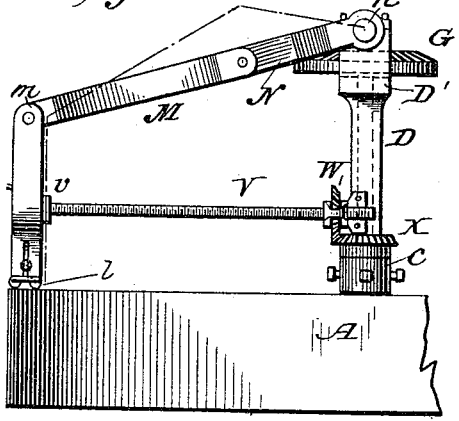
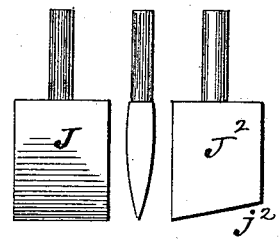
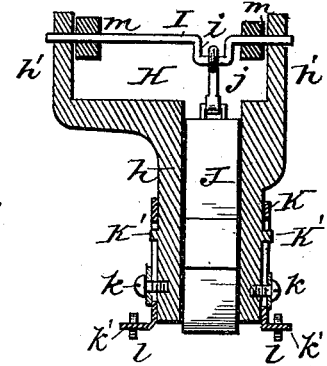
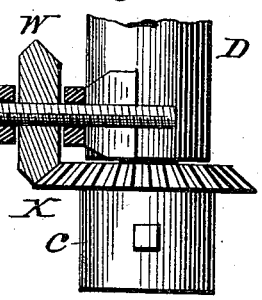
WITNESSES:
Fred G. Dieterich
M. D. Blondel
INVENTOR:
Geo. A. Smith
BY Mann
ATTORNEYS

UNITED STATES PATENT OFFICE.

GEORGE A. SMITH, OF COHOKE, VIRGINIA.

MILLSTONE-DRESSING MACHINE.

SPECIFICATION forming part of Letters Patent No. 463,460, dated November 17, 1891.

Application filed February 11, 1891. Serial No. 381,097. (No model.)

*To all whom it may concern:*

Be it known that I, GEORGE A. SMITH, residing at Cohoke, in the county of King William and State of Virginia, have invented certain new and useful Improvements in Millstone-Dressing Machines, of which the following is a specification.

My invention has for its object to provide a machine for dressing millstones which will serve to cut the furrows and facing in a simple, quick, and effective manner, and arranged to be operated by the drive-spindle of said millstones; and it consists in a suitably-arranged main frame or support carrying at its lower end a socket adapted to be secured to the upper end of the drive-spindle to turn therewith a stem or spindle connected to said socket, carrying a drive-gear at its upper end, a circumferentially and radially movable cutter-frame arranged to carry a vertically-reciprocating cutter or chisel, a jointed connection between such cutter-frame and the main frame, and belt-and-gear connections between the cutter-operating devices and the gear on the socket-spindle or shaft, whereby said devices are operated.

Furthermore, it consists of automatically-operated devices which serve to gradually feed the cutter-carrying frame radially toward the eye of the stone when said machine is used for cutting the furrows, and, finally, it consists in the peculiar combination and novel arrangement of the several parts, all of which will hereinafter be fully described in the annexed specification, and particularly pointed out in the claims, reference being had to the accompanying drawings, in which—

Figure 1 is a top plan of my machine. Fig. 2 is a side view of the same. Fig. 3 is a vertical longitudinal section of the same on the line 3 3, Fig. 1. Fig. 4 is a transverse section of the cutter-carrying frame taken on the line 4 4, Fig. 1. Fig. 5 is a detail view of the feed-screw hereinafter referred to, and Fig. 6 illustrates the cutters or chisels used in connection with my improved dressing-machine.

In the accompanying drawings, A indicates the bedstone, B the drive-spindle to which is secured the socketed end $c$ of a vertical shaft or spindle C, projected up through a sleeve D, carrying a frame D' at its upper end, the outer ends of which frame is formed with vertical arms $d\ d$, in which is journaled a horizontal shaft E, provided with a friction or gear wheel F, which gears with the drive-gear G on the upper end of the spindle C, as clearly shown in the drawings.

H indicates the cutter-frame, which consists of the vertically-socketed portion $h$, the lateral extensions having upwardly-projecting arms $h'\ h'$, in which is journaled a transverse shaft I, formed with a crank-arm $i$, with which connects the upper end of a shaft pitman-rod $j$, connected at its lower end with the reciprocating cutter or chisel J, the cutting depth of which is regulated by making the lower edge of the frame H adjustable relatively to the face of the stone, preferably in the manner shown in Fig. 4 of the drawings, by reference to which it will be seen that vertically-slotted plates K are secured to the outer edges of the portion $h$ of the frame and held thereto by the screws $k$ and guide-lugs K', said plates having lateral projections $k'$, in which friction-rollers $l\ l$ are journaled, which serve to render the movement of the frame on the stone easy, it being obvious that to accommodate the tread of the rollers to the different movements of the cutter-frame, as hereinafter described, they may have swivel-bearings in said extensions $k'$.

As will be understood from the drawings, I arrange the cutters to reciprocate vertically in its frame, and I arrange such frame for movement radially to and circumferentially about the eye of the stone, and to provide for such movement and yet operate the cutters, as described, from the drive-spindle B, I connect such cutter-frame with the main frame in the manner most clearly shown in Figs. 1 and 3 of the drawings, by reference to which it will be seen that I employ a jointed frame formed of the two sections M N, pivotally connected at their ends $m$ and $n$ with the cutter-frame and main frame, respectively. By this construction it will be observed that when the cutters are arranged to operate at the outer edges of the stone the frame M N will be drawn out to its longest position, (see Fig. 2,) and as the frame H moves radially inward the frame M N will fold up in a position shown in Fig. 3, whereby said frame H will be capable of movement radially from the periphery to the eye of the stone, such construction also allowing for a belt connection between a pulley O on the shaft F and the pulley P on shaft I in frame H, the belt Q being guided and held taut by the guide R and the pulleys S and T in the part N of the connecting-frame. U indicates a handle on the frame H, by which the operator can guide the cutters on the face of the stone.

The construction, so far as described, is the one I prefer to use for facing the stone, as the operator at all times has control of the cutter-frame and can adjust the same radially by moving the frame H inward toward the eye of the stone or circumferentially by rotating the main frame and cutter-frame on the spindle C.

It will be understood that the chisel or cutter J can be adjusted either concentric with the eye of the stone or set tangentially thereto, as desired, such cutter being formed with a straight cutting-edge, as shown in Fig. 6. When it is desired to cut the furrows in the stone, I employ a feed-screw device, which serves to automatically draw the cutter-frame toward the eye of the stone, the frame being held to the furrow-marks on the stone by the operator gradually turning the entire frame on the spindle C. When cutting the furrows, I employ a cutter $J^2$, having an inclined cutting-edge $j^2$, so as to cut the bevel-face of the furrows. In operation, after the furrows have been marked off on the stone and the cutter adjusted to the proper angle tangent to the eye the frame H is pulled out to the outer edge of the stone. Now, as the cutters are operated the frame is gradually drawn toward the eye by the feed-screw V, which has a swivel connection at $v$ with frame H, and passes through an internally-threaded gear W, which is supported on the sleeve D, and receives motion from the gear X on the hub $c$, as shown, the operator guiding the frame H to follow the draft of the furrows by gently turning the entire frame upon the spindle C, as stated. When I use the machine for facing, I prefer to omit the feed devices and feed the cutter-frame inward by hand.

In practice I form the shaft F with a clutch mechanism, (not shown,) whereby the gear E may be thrown out of operation with the drive-gear, if desired, so as to stop the operation of the cutters.

While I have shown my machine as in use for dressing the bed-stone it is manifest that the top stone or runner can be treated in the same manner by inverting it on the bed-stone and connecting the socket $c$ by any suitably-arranged extension-piece with the spindle B.

My improved machine can be constructed at a small cost, is portable, and can be quickly adjusted for operation.

It is obvious that in the practical application of my improved machine the feed-screw V and the operating-gear W may be arranged for reverse operation, whereby the cutter-frame may be automatically fed inward or outward.

Having thus described my invention, what I claim, and desire to secure by Letters Patent, is—

1. In a millstone-dressing machine, the combination, with the drive-spindle B, the revolving spindle C, mounted on the spindle B, the main frame held to turn on the said spindle C, a drive-shaft mounted in said main frame geared with and operated by the spindle C, of the frame H, a hinged connection between said frame and the main frame, a crank-shaft mounted in the frame H, a cutter held to reciprocate vertically in said frame H and operated by the crank-shaft, and a belt connection between said crank-shaft and the drive-shaft in the main frame, substantially as and for the purpose described.

2. The combination, with the spindle B, a second spindle C, detachably connected to the spindle B, of a frame D D', mounted to turn on the spindle C, said spindle C having a gear-wheel G at its upper end, the transverse shaft E, geared with the wheel G, the frame H, carrying a reciprocating cutter, a jointed frame connecting the main and cutter frames, and the drive mechanism connecting the cutter-operating devices and the shaft E, all arranged substantially as shown and described.

3. The combination, with the spindle B and the spindle C, detachably connected with and arranged to be operated thereby, of the main frame D D', mounted on the spindle C, the frame H, having a guide-handle U, a crank-shaft I, journaled therein, a vertically-reciprocating cutter J, operated by the shaft I, the jointed frame M N, connecting the frame H with the main frame D D', and the belt and gear and gear connections between the shaft I and the spindle C, substantially as and for the purpose described.

4. In a millstone-dressing machine, the combination, with the spindle B, of the spindle C, formed with a socket $c$, fitting the spindle B, the sleeve D, held on the spindle C, the main frame carried by the sleeve D, a gear W, held on the socket $c$, and an internally-threaded gear V, held on the sleeve D of the cutter-carrying frame H, a vertically-reciprocating cutter held in said frame, a jointed connection between said frame and the main frame, whereby it is adapted for adjustment to or from said main frame, a feed-screw connected to the frame H and operated by the threaded gear V, whereby said frame is automatically drawn inward as the spindle revolves, substantially as and for the purpose described.

5. In a millstone-dressing machine, the combination, with the spindle B, a main frame held to turn on said spindle, of an arm M, hinged at one end to the main frame, the cutter-carrying frame H, hinged to the outer end of such arm M, a vertically-reciprocating cutter held to operate in the frame H, said frame arranged to be radially or tangentially moved to or from the spindle B, and means for operating the cutter, substantially as and for the purpose described.

GEORGE A. SMITH.

Witnesses:
W. H. GARNETT,
AUGUSTINE ROYELL.